(12) United States Patent
Mamidwar et al.

(10) Patent No.: US 9,088,807 B2
(45) Date of Patent: Jul. 21, 2015

(54) AUDIO/VIDEO CHANNEL TRANSBONDING IN A NETWORK DEVICE

(71) Applicant: Broadcom Corporation, Irvine, CA (US)

(72) Inventors: Rajesh Shankarrao Mamidwar, San Diego, CA (US); Xuemin Chen, Rancho Santa Fe, CA (US); Victor Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/331,866

(22) Filed: Jul. 15, 2014

(65) Prior Publication Data

US 2014/0331269 A1   Nov. 6, 2014

Related U.S. Application Data

(63) Continuation of application No. 13/672,998, filed on Nov. 9, 2012, now Pat. No. 8,819,755.

(60) Provisional application No. 61/663,878, filed on Jun. 25, 2012, provisional application No. 61/609,339, filed on Mar. 11, 2012.

(51) Int. Cl.
*H04N 7/173* (2011.01)
*H04N 21/2368* (2011.01)
*H04N 21/40* (2011.01)
*H04L 5/00* (2006.01)
*H04L 25/14* (2006.01)
*H04N 21/21* (2011.01)
*H04N 21/2389* (2011.01)

(52) U.S. Cl.
CPC .......... *H04N 21/2368* (2013.01); *H04L 5/0044* (2013.01); *H04L 25/14* (2013.01); *H04N 21/21* (2013.01); *H04N 21/2389* (2013.01); *H04N 21/40* (2013.01)

(58) Field of Classification Search
USPC ............... 725/93, 95, 98, 105, 114, 116, 117, 725/118, 119
See application file for complete search history.

(56) References Cited

U.S. PATENT DOCUMENTS

| H2065 H | 5/2003 | Hong et al. |
|---|---|---|
| 2013/0010585 A1 | 1/2013 | Chu et al. |
| 2013/0160069 A1 | 6/2013 | You et al. |

*Primary Examiner* — John Schnurr
(74) *Attorney, Agent, or Firm* — Brinks Gilson & Lione

(57) ABSTRACT

A data communication architecture delivers a wide variety of content, including audio and video content, to consumers. The architecture employs channel bonding to deliver more bandwidth than any single communication channel can carry. The architecture includes intermediate network devices that may receive content and send content using different groups of communication channels. The network device may process content received across a first set of communication channels for transmission across a second set of communication channels different from the first set. Such processing may preserve a program order of the content during delivery to a destination device.

20 Claims, 10 Drawing Sheets

AUDIO/VIDEO CHANNEL TRANSBONDING IN A NETWORK DEVICE

CROSS REFERENCE TO RELATED APPLICATIONS

This application is a continuation of U.S. application Ser. No. 13/672,998, filed on Nov. 9, 2012, titled "Audio/Video Channel Transbonding In A Network Device", which claims the benefit of U.S. Provisional Application Ser. No. 61/663,878, filed on Jun. 25, 2012, and U.S. Provisional Application Ser. No. 61/609,339, filed on Mar. 11, 2012. The contents of each of the applications above are incorporated herein by reference in their entirety.

TECHNICAL FIELD

This disclosure relates to audio and video communication techniques. In particular, this disclosure relates to channel bonding for audio and video communication.

BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices will help continue to drive demand for not only the devices, but for the content delivery services that feed the devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
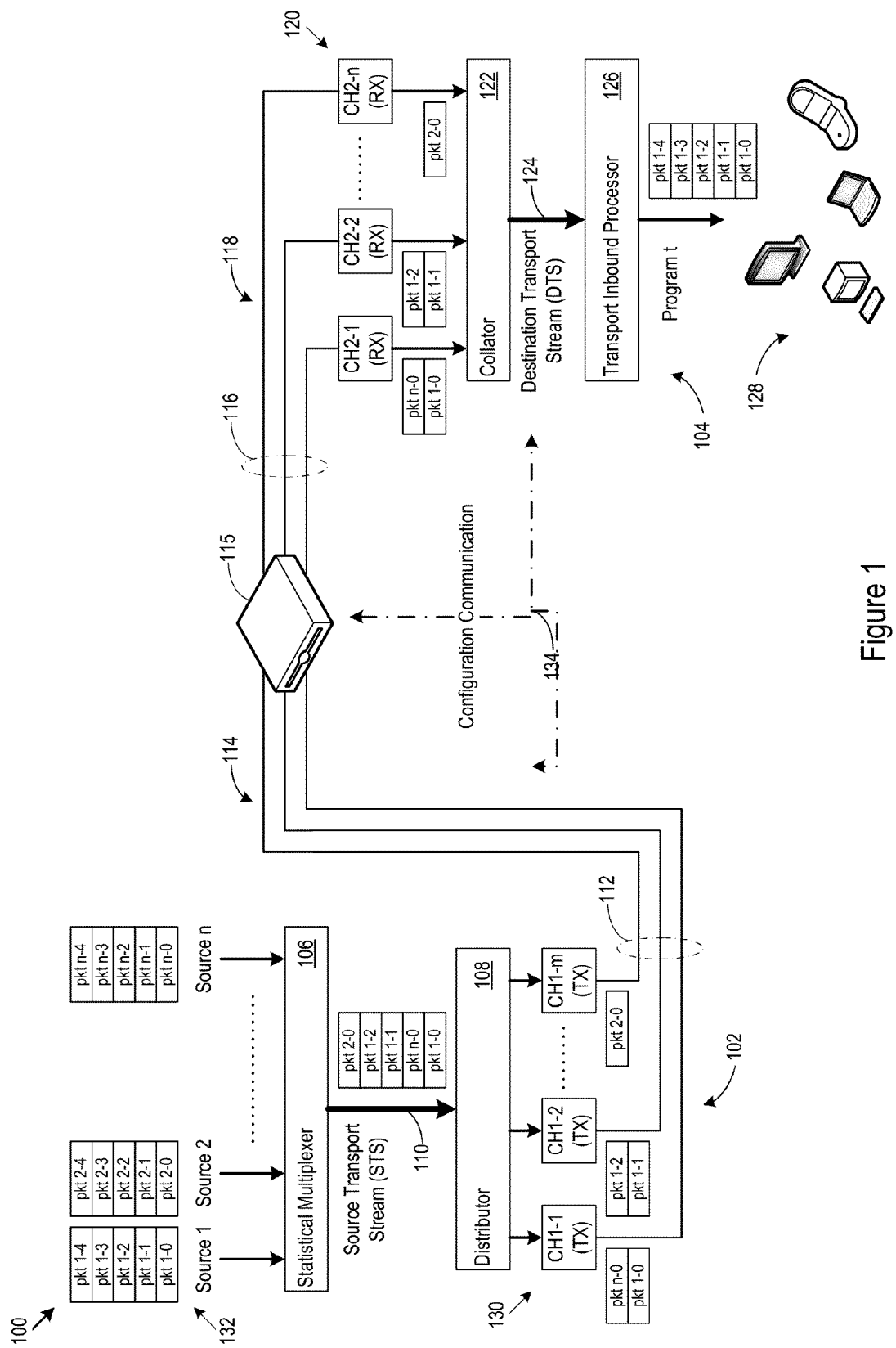
FIG. 1 shows an example content delivery architecture that employs channel bonding.

FIG. 1 shows an example content delivery architecture 100. The architecture 100 delivers data (e.g., audio streams and video programs) from a source 102 to a destination 104. The source 102 may include satellite, cable, or other media providers, and may represent, for example, a head-end distribution center that delivers content to consumers. The source 102 may receive the data in the form of Motion Picture Expert Group 2 (MPEG2) Transport Stream (TS) packets 128, when the data is audio/visual programming, for example. The destination 104 may be a home, business, or other location, where, for example, a set top box processes the data sent by and received from the source 102. The discussion below makes reference to packets, and in some places specific mention is made of MPEG2 TS packets. However, the channel bonding techniques described below may be applied to a wide range of different types and formats of data and communication units, whether they are MPEG2 TS packets, packets of other types, or other types of communication units, and the techniques are not limited to MPEG2 TS packets at any stage of the processing.

The source 102 may include a statistical multiplexer 106 and a distributor 108. The statistical multiplexer 106 helps make data transmission efficient by reducing idle time in the source transport stream (STS) 110. In that regard, the statistical multiplexer 106 may interleave data from multiple input sources 132 together to form the transport stream 110. For example, the statistical multiplexer 106 may allocate additional STS 110 bandwidth among high bit rate program channels and relatively less bandwidth among low bit rate program channels to provide the bandwidth needed to convey widely varying types of content at varying bit rates to the destination 104 at any desired quality level. Thus, the statistical multiplexer 106 very flexibly divides the bandwidth of the STS 110 among any number of input sources.

Several input sources 132 are present in FIG. 1: Source 1, Source 2, . . . , Source n. There may be any number of such input sources carrying any type of audio, video, or other type of data (e.g., web pages or file transfer data). Specific examples of source data include MPEG or MPEG2 TS packets for digital television (e.g., individual television programs or stations), and 4K×2K High Efficiency Video Coding (HEVC) video (e.g., H.265/MPEG-H) data, but the input sources may provide any type of input data. The source data (e.g., the MPEG 2 packets) may include program identifiers (PIDs) that indicate a specific program (e.g., which television station) to which the data in the packets belongs.

The STS 110 may have a data rate that exceeds the transport capability of any one or more communication links between the source 102 and the destination 104. For example, the STS 110 data rate may exceed the data rate supported by a particular cable communication channel exiting the source 102. To help deliver the aggregate bandwidth of the STS 110 to the destination 104, the source 102 includes a distributor 108 and modulators 130 that feed a bonded channel group of multiple individual communication channels, labeled as the bonded channel group 112 in FIG. 1. In other words, the source 102 distributes the aggregate bandwidth of the STS 110 across multiple outgoing communication channels that form the bonded channel group 112, and that together provide the bandwidth for communicating the data in the STS 110 to the destination 104.

The distributor 108 may be implemented in hardware, software, or both. The distributor 108 may determine which data in the STS 110 to send on which communication channel. The distributor 108 may divide the STS 110 into chunks of one or more packets. The chunks may vary in size over time, based on the communication channel that will carry the chunk, the program content in the chunk, or based on any other desired chunk decision factors implemented in the distributor 108.

The distributor 108 may forward any particular chunk to the modulator for the channel that the distributor 108 has decided will convey that particular chunk to the destination 104.

In that regard, the multiple individual communication channels within the bonded channel group 112 provide an aggregate amount of bandwidth, which may be less than, equal to, or in excess of the aggregate bandwidth of the STS 110. As just one example, there may be three 30 Mbs physical cable channels running from the source 102 that handle, in the aggregate, up to 90 Mbs. The communication channels in a bonded channel group may be any type of communication channel, including dial-up (e.g., 56 Kbps) channels, ADSL or ADSL 2 channels, coaxial cable channels, wireless channels such as 802.11a/b/g/n channels or 60 GHz WiGig channels, Cable TV channels, WiMAX/IEEE 802.16 channels, Fiber optic, 10 Base T, 100 Base T, 1000 Base T, power lines, or other types of communication channels. A bonded channel group may include any number of communication channels that vary in type.

The bonded channel group 112 travels over any number of transport mechanisms 114 suitable for the communication channels within the bonded channel group 112. The transport mechanisms 114 may include physical cabling (e.g., fiber optic or cable TV cabling), wireless connections (e.g., satellite, microwave connections, 802.11a/b/g/n connections), or any combination of such connections.

The content delivery architecture 100 may include any number of intermediate network nodes between the source 102 and the destination 104, such as the network device 115. The network device 115 may be any type of device that routes network traffic, including as examples, a packet switch, router, hub, gateway, server, blade, or any other data traffic handling devices or logic. The network device 115 may be aware of the communication channels through which the network device 115 may communicate across to receive data, send data, or both. The network device 115 may receive incoming data across any particular set of communication channels in an incoming channel bonding group, but need not have a matching set of communication channels in the outbound direction, e.g., in an outgoing channel bonding group. In FIG. 1, the network device 115 receives data from the source 102 through incoming bonded channel group 112 over transport mechanisms 114. The network device 115 sends data to the destination 104 through outgoing bonded channel group 116 over transport mechanisms 118. As discussed in greater detail below, the network device 115 may perform a channel transbonding process, which may refer to processing data received through an incoming bonding configuration for delivery through an outgoing bonding configuration. In that regard, the network device 115 may receive the STS 110 data from the source 102 through the bonded channel group 112, transbond the STS 110 data, and send the STS 110 data to the destination 104 through the bonded channel group 116.

At the destination 104, the bonded channel group 116 is input into individual channel demodulators 120. The channel demodulators 120 recover the data sent by the network device 115 in each communication channel. A collator 122 collects the data recovered by the demodulators 120, and may create a destination transport stream (DTS) 124. The DTS 124 may be one or more streams of packets recovered from the individual communication channels as sequenced by the collator 122.

The destination 104 also includes a transport inbound processor (TIP) 126. The TIP 126 processes the DTS 124. For example, the TIP 126 may execute program identifier (PID) filtering for each channel independently of other channels. To that end, the TIP 126 may identify, select, and output packets from a selected program (e.g., a selected program 't') that are present in the DTS 124, and drop or discard packets for other programs. In the example shown in FIG. 1, the TIP 126 has recovered program 't', which corresponds to the program originally provided by Source 1. The TIP 126 provides the recovered program to any desired endpoints 128, such as televisions, laptops, mobile phones, and personal computers. The destination 104 may be a set top box, for example, and some or all of the demodulators 120, collator 122, and TIP 124 may be implemented as hardware, software, or both in the set top box.

The source 102, the destination 104, and intermediate network nodes such as the network device 115 may exchange configuration communications 134. The configuration communications 134 may travel over an out-of-band or in-band channel between the source 102, network device 115, and the destination 104, for example in the same or a similar way as program channel guide information, and using any of the communication channel types identified above. Configuration communications 134 may be exchanged between a data-sending device and a data-receiving device linked through one or more bonded channel groups. One example of a configuration communication 134 is a message from a data-sending device (e.g., the source 102 that sends data of STS 110 to the network device 115) to a data-receiving device (e.g., the network device 115 that receives data of the STS 110 from the source 102). The message may convey the parameters of the bonded channel group 112 that links the source 102 and the network device 115. More specifically, the configuration communication 134 may specify the number of communication channels bonded together; identifiers of the bonded communication channels; the types of programs that the bonded communication channels will carry; marker packet format; chunk, program packet, or marker packet size; chunk, program packet, or marker packet PID or sequence number information, or any other chunk or bonding configuration information that facilitates processing of the bonded channel group 112 at the network device 115.

One example of a configuration communication message from a data-receiving device (e.g., the network device 115) to a data-sending device (e.g., the source 102) is a configuration communication 134 that specifies the number of communication channels that the data-receiving device may process as eligible bonded channels; identifiers of the eligible bonded channels; status information concerning status of demodulators at the data-receiving device, e.g., that a demodulator is not functioning and that its corresponding communication channel should not be included in a bonded channel group; channel conditions that affect bit rate or bandwidth; or any other information that the data-sending device may consider that affects processing of the data into a bonded channel group.

Figure 2:
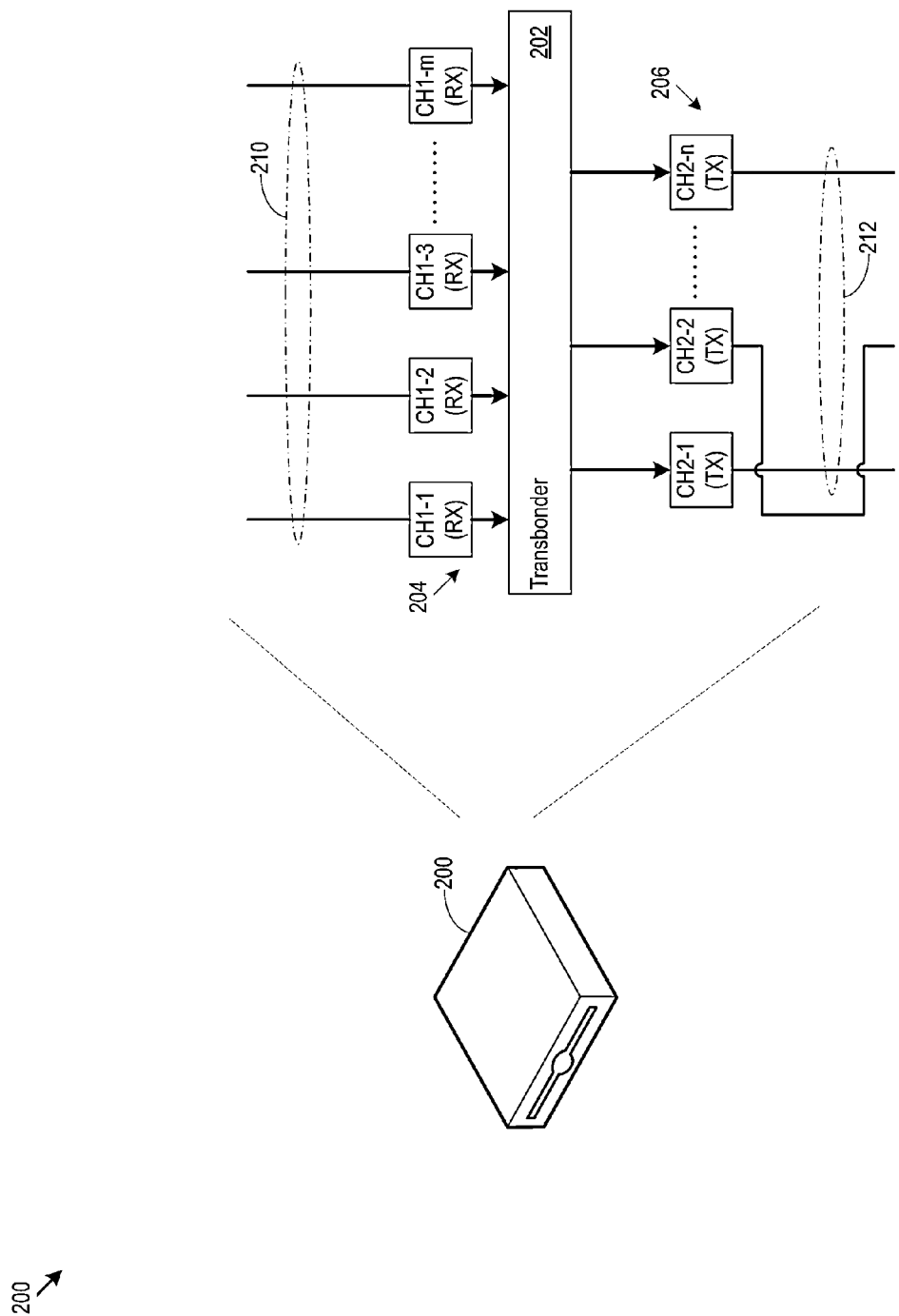
FIG. 2 shows an example of a network device for transbonding network data.

FIG. 2 shows an example of a network device 200 for transbonding network data. The network device 200 may be any intermediate network node in the content delivery architecture 100. The network device 200 may, for example, route data of the STS 110 sent from the source 102 for delivery to the destination 104. In that regard, the network device 200 may receive data, e.g., STS 110 data, from an upstream device in a communication path linking the source 102 and the destination 104. Upstream devices include the source 102 or an upstream network node. The network device 200 may send data to any downstream device, such as a downstream network node or the destination 104.

The network device 200 includes a transbonder 202 and demodulators 204, for recovering data received by the network device 200 through incoming communication channels.

The network device 200 also includes modulators 206 for sending data through outgoing communication channels. The network device may receive data through an incoming bonded channel group 210 and send data through an outgoing bonded channel group 212.

The outgoing bonded channel group 212 may differ from the incoming bonded channel group 210 in various ways. The outgoing bonded channel group 212 may include none, some, or all of the communication channels in the incoming bonded channel group 210. Similarly, the incoming bonded channel group 210 may include none, some, or all of the communication channels in the outgoing bonded channel group 210. The incoming and outgoing bonded channel groups may differ in number of communication channels, in types of communication channels, in any communication parameter, or in other ways.

Turning to the transbonding process, the transbonder 202 receives data from an upstream device according to an incoming bonding configuration. In the example shown in FIG. 2, the incoming bonding configuration includes the incoming bonded channel group 210. However, the transbonder 202 may receive input data from one or more incoming bonded channel groups, one or more individual incoming communication channels, or any combination of both, as discussed in greater detail in FIG. 7 below. The transbonder 202 processes the received input data for delivery to a downstream device according to an outgoing bonding configuration, which in the example shown in FIG. 2 includes the outgoing bonded channel group 212. As discussed in greater detail in FIG. 8 below, the transbonder 202 transbond received input data for delivery across one or more outgoing bonded channel groups, individual outgoing communication channels, or any combination of both.

The transbonder 202 may process received data according to any number of transbonding configuration parameters. The transbonding configuration parameters may specify any number of incoming bonding configuration parameters, such as the number of communication channels in the incoming bonded channel group 210, the communication channels that may be included in the incoming bonded channel group 210, the type of communication channels that may be included in the incoming bonded channel group 210, when and for how long communication channels for channel bonding, bonding adaptation criteria, and any other parameters that may indicate how and when program data is received by the network device 200 across the communication channels in the incoming bonded channel group 210. The incoming bonding configuration parameters may specify any of the above parameters for any incoming bonded channel group or individual communication channel through which the network device 200 receives input data. The transbonding configuration parameters may also specify any number of outgoing bonding configuration parameters, which may include similar parameters as discussed above regarding the incoming bonding configuration parameters for any outgoing bonded channel group or individual outgoing communication channel through which the network device 200 sends data.

As additional examples, the transbonding configuration parameters may specify operational parameters that the transbonder 202 operates according to. The transbonding configuration parameters may indicate how an upstream device processed and distributed the input data received by the transbonder 202, including, as examples, packet size, chunk sizes, communication parameters, content and form, or additional channel bonding information with respect to received input data. These upstream processing and distribution parameters allow the transbonder 202 to interpret and analyze the data received through, for example, the incoming bonded channel group 210. The transbonding configuration parameters may include a debonding level parameter, specifying the degree to which the transbonder 202 debonds the received input data. As discussed below, debonding may refer to a process for reconstructing the received input data into an ordered transport stream, e.g., the degree to which the transbonder reconstructs the STS 110. In that regard, debonding may share similar characteristics with the analyzing and sequencing functionality implemented by the collator 122 to produce the DTS 124. The transbonding configuration parameters may also specify a distribution approach and distribution parameters for delivering the data to a downstream network device.

Several transbonding processing options are discussed next in FIGS. 3-8. The exemplary options are presented as logic that the transbonder 202 may implement. The options vary in the degree that the received data is debonded. The options also vary according to how the data was processed and distributed at an upstream device, including the form, location, and/or content of additional channel bonding information regarding the received packets, e.g., as additional marker packets, as spare bits in network frames at the data-link layer, as program ID (PID) and sequence ID (SID) data located in the packets themselves, or others. Content distribution techniques incorporating additional channel bonding information are presented in U.S. patent application Ser. No. 13/673,028, filed Nov. 9, 2012, and titled "Audio/Video Channel Bonding Architecture", the contents of which are hereby incorporated by reference in their entirety. And while some exemplary scenarios and logic is provided below, the transbonder 202 can receive, recover, collate, distribute, or transmit data consistent with any of the content delivery architectures presented in U.S. patent application Ser. No. 13/673,028.

Figure 3:
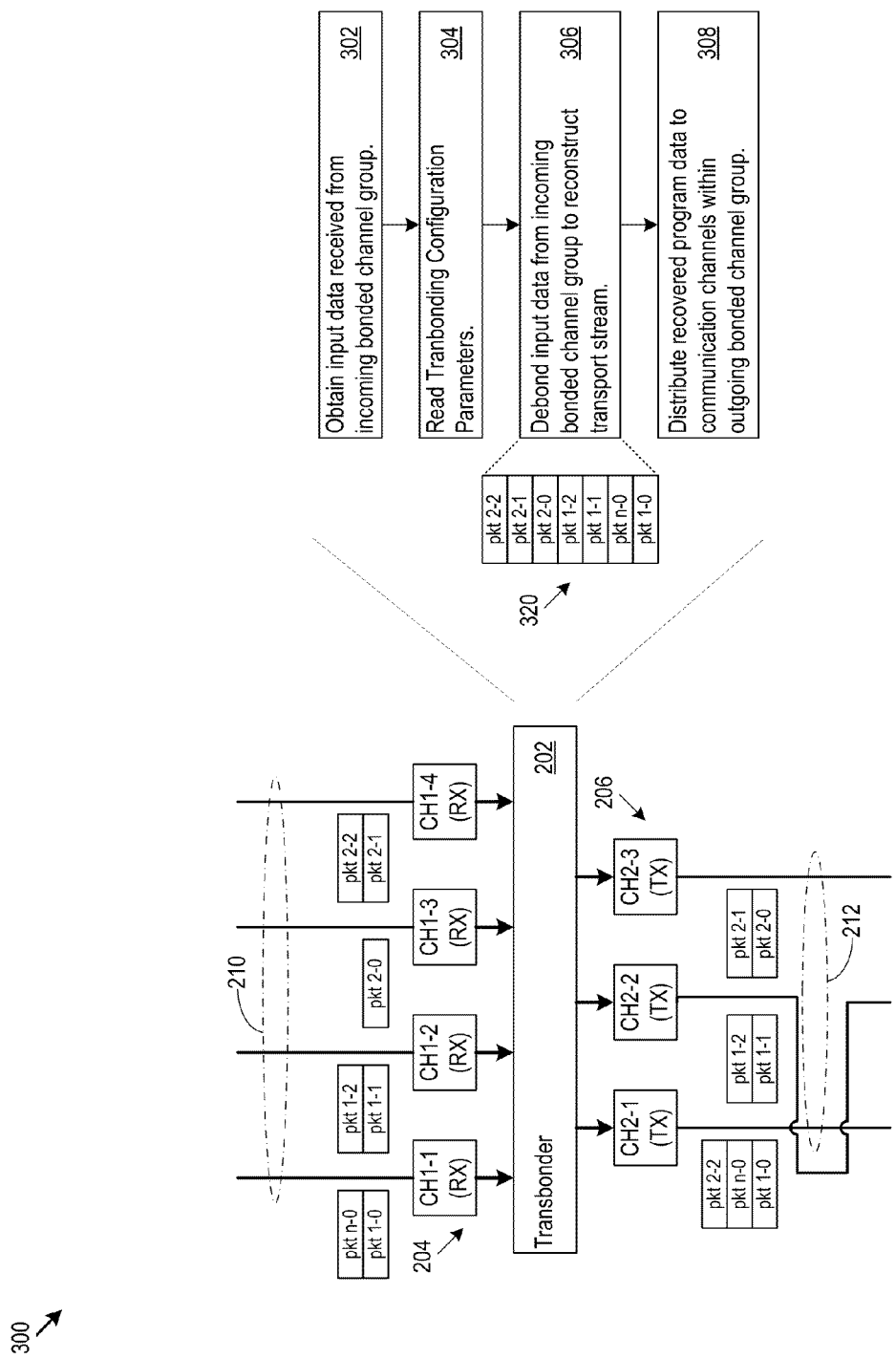
FIG. 3 shows an example of logic for transbonding network data.

FIG. 3 shows an example of logic 300 for transbonding network data that the transbonder 202 may implement in hardware, software, or both. The transbonder 202 obtains input data, e.g., packet data, received through communication channels of an incoming bonded channel group 210 (302). In FIG. 3, the incoming bonded channel group 210 includes four (4) communication channels, which individually correspond to one of the demodulators 204 labeled for communication channels Ch1-1, CH1-2, CH1-3, and CH1-4.

The transbonder 202 reads the transbonding configuration parameters (304), which specify attributes of the incoming bonded channel group 210 and outgoing bonded channel group 212. The transbonding configuration parameters may specify bonding parameters used by the upstream device sending the input data across the incoming bonded channel group 210. In FIG. 3, the transbonding configuration parameters indicate that the received input data does not include additional channel bonding data.

The transbonding configuration parameters may also instruct the transbonder 202 to debond the received packet data. The transbonder 202 transbonds, e.g., processes, the received input data according to the transbonding configuration parameters. In FIG. 3, the transbonder 202 performs a transbonding process that includes debonding the input data received through the incoming bonded channel group 210 (306) to fully reconstruct a transport stream sent by an upstream device, such as the reconstructed transport stream labeled as 320. In one implementation, the transbonder 202 includes a collator 122 or similar logic that analyzes group information, sequence information, PIDs, and any other desired information obtained from the received data packets arriving on the communication channels and constructs the transport stream from the received packet data. The reconstructed transport stream 320 may convey the program packets in the same sequence as the STS 110, for example.

Continuing the transbonding process, the transbonder 202 distributes the recovered program data for delivery to a downstream device. Specifically, the transcoder 202 distributes the reconstructed transport stream 320 to communication channels in the outgoing bonded channel group 212 (308). The transcoder 202 may employ a distribution approach specified by the transbonding configuration parameters. In the example shown in FIG. 3, the transbonder 202 distributes packets of the reconstructed transport stream for delivery across the three (3) communication channels of the outgoing bonded channel group 212. The received packets may include PID and SID data to support routing of the packets without additional marker packets, which may allow the transbonder 202 to distribute the received input data across the outgoing bonded channel group 212 without generating or appending additional channel bonding information. In this example, the transbonder 202 pushes the reconstructed transport stream 320 two packets at a time in a round robin manner to the communication channels composing the outgoing bonded channel group 212. Accordingly, given the example reconstructed transport stream 320 of {pkt 1-0, pkt n-0, pkt 1-1, pkt 1-2, pkt 2-0, pkt 2-1, pkt 2-2}, the transbonder 202 pushes:

pkt 1-0 and pkt n-0 to channel 2-1; pkt 1-1 and pkt 1-2 to channel 2-2, pkt 2-0 and pkt 2-1 to channel 2-3; then pkt 2-2 to channel 2-1; and so on.

Other distribution approaches and parameters are contemplated, including adding marker packets on a per-channel basis or generating, adding markers on a per-chunk basis, and/or routing according to data-link layer channel bonding information.

Figure 4:
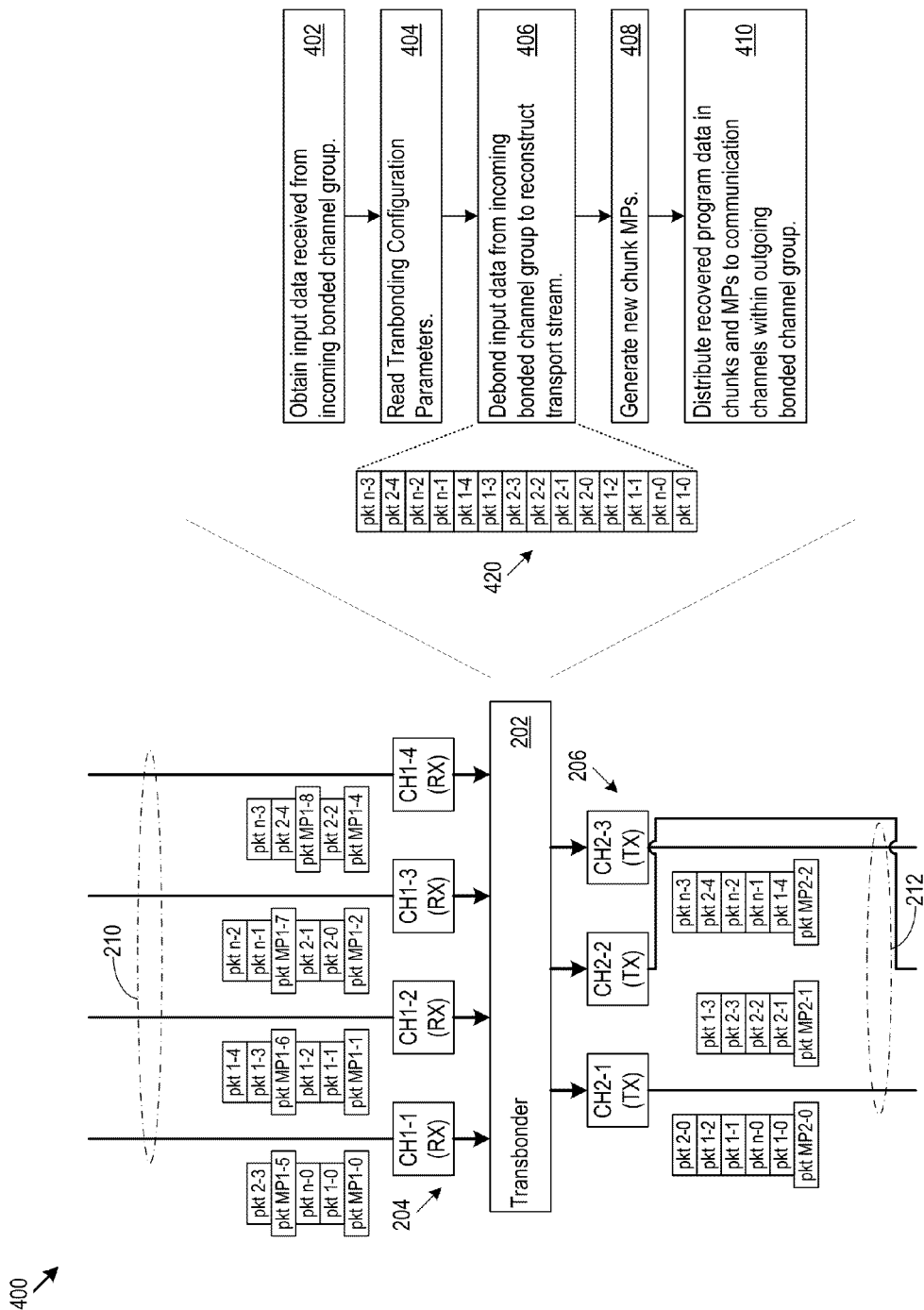
FIG. 4 shows an example of logic for transbonding network data.

FIG. 4 shows an example of logic 400 for transbonding network data that the transbonder 202 may implement in hardware, software, or both. The transbonder 202 obtains input data received through communication channels of an incoming bonded channel group 210 (402) and reads the transbonding configuration parameters (404). In FIG. 4, the transbonding configuration parameters indicate the input data received from the incoming bonded channel group 210 includes inserted marker packets. The transbonding configuration parameters may also instruct the transbonder 202 to fully debond the received packet data.

The transbonder 202 transbonds the received packet data according to the transbonding configuration parameters. In the example shown in FIG. 4, the transbonder 202 transbonds the received input data by debonding the input data received through the incoming bonded channel group 210 (406) to obtain the reconstructed transport stream labeled as 420. To do so, the transbonder 202 processes the marker packets and packet data associated with (e.g., following) each marker packet. The transbonder 202 may align packets in order by examining the marker packets. Accordingly, the transbonder 202 may identify a channel number in the marker packets that specifies the sequence of communication channels in the incoming bonded channel group 210 that the transbonder 202 will receive packers. As one example, the transbonder 202 obtains packets in a round-robin manner that matches a round-robin distribution approach by an upstream device sending the packet data. Or, the transbonder 202 may collect packets from the demodulators 204 of communication channels of the incoming bonded channel group 210 as specified according to the transbonding configuration parameters. In constructing the reconstructed transport stream 420, the transbonder 202 may discard marker packets, other additional channel bonding information, or other portions of the received input data that are part of, for example, the STS 110.

In the example shown in FIG. 4, the transbonder 202 distributes the reconstructed transport stream 402 as chunks of one or more packets to the outgoing communication channels of the outgoing bonded channel group 212. As examples, a chunk may be 1 packet, 10 packets, 100 packets, 27 packets, 10,000 packets, 100 ms of packets, 20 ms of packets, 30 ms of video data, 5 s of audio data, or any other number or timing of packets or audio/visual content. The chunk size may be specified by the transbonding configuration parameters. The chunk size of chunks sent through the outgoing bonded channel group 212 may differ from the chunk size of chunks received from the incoming bonded channel group 210.

The transbonder 202 generates marker packets that precede the chunks (408) and distributes the chunks and MPs across the communication channels of the outgoing bonded channel group 212 (410). As seen in FIG. 4, the transbonder 202 distributes the reconstructed transport stream 420 of {pkt 1-0; pkt n-0; pkt 1-1; pkt 1-2; pkt 2-0; pkt 2-1; pkt 2-2; pkt 2-3; pkt 1-3; pkt 1-4; pkt n-1; pkt n-2; pkt 2-4; pkt n-3} as chunks of four or five packets across the communication channels CH2-1, CH2-2, and CH2-3 in the outgoing bonded channel group 212.

Figure 5:
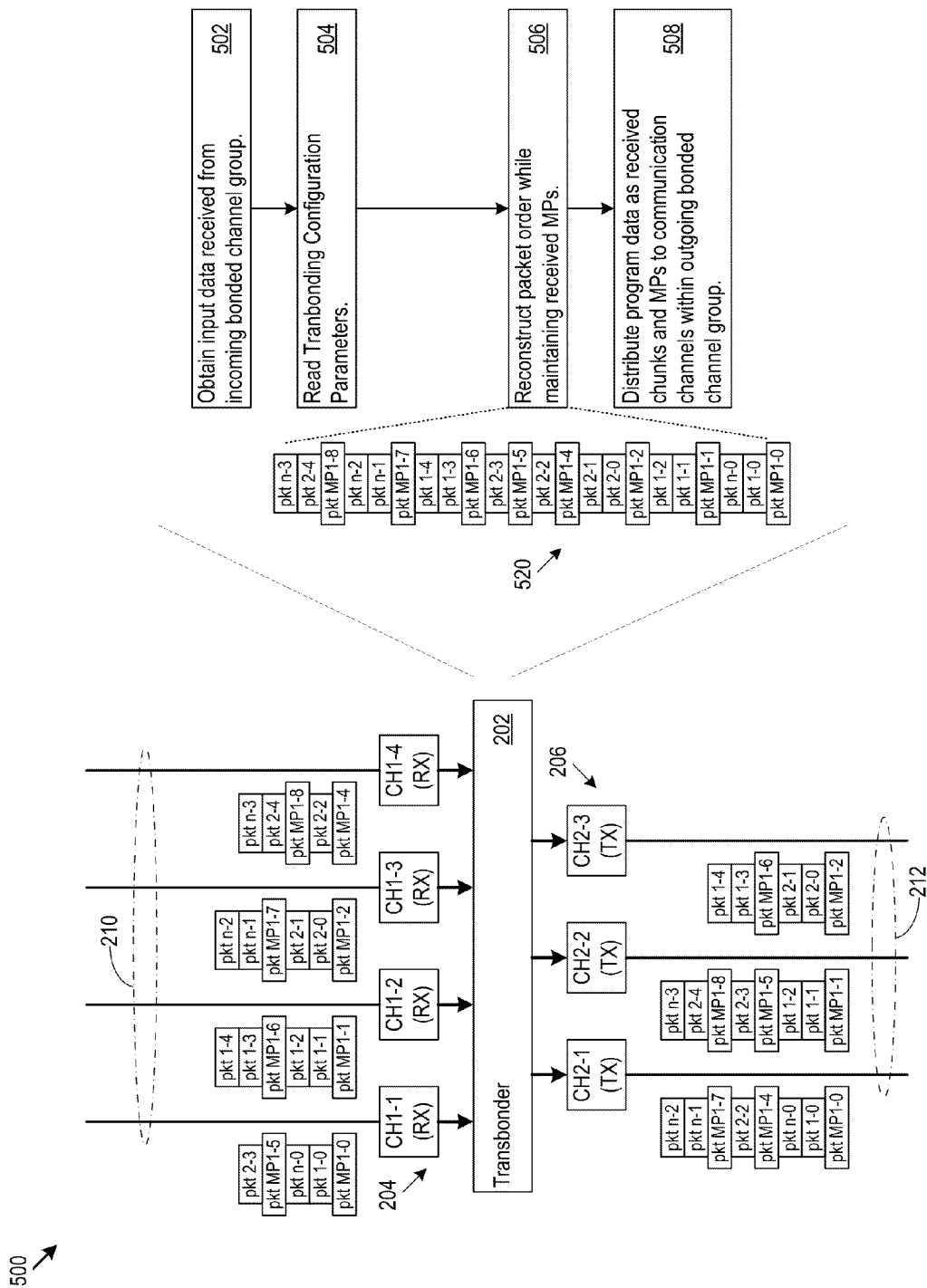
FIG. 5 shows an example of logic for transbonding network data.

FIG. 5 shows an example of logic 500 for transbonding network data that the transbonder 202 may implement in hardware, software, or both. The transbonder 202 may distribute received packet data across the outgoing bonded channel group 212 using one or more distribution approaches and/or parameters employed by an upstream device that distributed the received across the incoming bonded channel group 210. As seen in FIG. 5, the transbonder 202 distributes input data by reusing the chunk size and marker packets through which the input data was received. The transbonder 202 may utilize any additional channel bonding information, parameters, or techniques utilized by the upstream stream device in sending the received input data to the transbonder 202.

The transbonder 202 obtains input data received through communication channels of an incoming bonded channel group 210 (502) and reads the transbonding configuration parameters (504). In this example, the transbonding configuration parameters indicate that input data received from the incoming bonded channel group 210 includes inserted marker packets. The transbonding configuration parameters may also specify the distribution approach and/or parameters employed by an upstream device that sent the input data.

The transbonder 202 may transbond the received packet data by performing a partial debond. Partial debonding may refer to processing received input data for delivery without entirely (e.g., fully) reconstructing the transport stream. As one example, the transbonder 202 partially debonds the received input data by ordering the received input data in a sequential order of the transport stream while maintaining additional channel bonding information. For example, the transbonder 202 may order the received input data into sequential packet order of a corresponding portion of the STS 110 without discarding the received MPs inserted by the upstream device. As seen in FIG. 5, the transbonder 202 produces the partially debonded transport stream 520 that includes marker packets, as received through the incoming bonded channel group 210, interleaved between packets arranged in a sequential order according to the STS 110. To produce the partially debonded transport stream 520, the transbonder 202 may collect chunks of packet data from the demodulators 204 consistent with the distribution approach employed by an upstream device, e.g., in a round-robin fashion and/or according to a particular chunk size.

In the example shown in FIG. 5, the transbonder 202 receives the MPs, and synchronizes the received data streams according to MPs of the same group number and in sequence across the communication channels that are part of the incoming bonded channel group 210. The transbonder 202 obtains each MP and each chunk following the MPs according to group number and channel number. In this manner, the transbonder 202 produces a partially debonded transport stream 520 that maintains the packet order of a previously distributed transport stream without removing additional channel bonding information, such as the marker packets (506).

The transbonder 202 may distribute the partially debonded transport stream 520 across communication channels of the outgoing bonded channel group 212 (508). In the example shown in FIG. 5, the transbonder 202 distributes the partially debonded transport stream 520 using the marker packets and the chunk sizes already included within the partially debonded transport stream 520. Thus, for the partially debonded transport stream 520 of {pkt MP1-0; pkt 1-0; pkt n-0; pkt MP1-1; pkt 1-1; pkt 1-2; pkt MP1-2; pkt 2-0; pkt 2-1; pkt MP1-4; pkt 2-2; pkt MP1-5; pkt 2-3; pkt MP1-6; pkt 1-3; pkt 1-4; pkt MP1-7; pkt n-1; pkt n-2; pkt MP1-8; pkt 2-4; pkt n-3}, the transbonder 202 pushes:

pkt MP1-0, pkt 1-0, and pkt n-0 to channel CH2-1; pkt MP1-1, pkt 1-1, and pkt 1-2 to channel CH2-2; pkt MP1-2, pkt 2-0, pkt 2-1 to channel CH2-3; then pkt MP1-4 and pkt 2-2 to channel CH2-1; pkt MP1-5 and pkt 2-3 to channel CH2-2; pkt MP1-6, pkt 1-3, and pkt 1-4 to channel CH2-3; then pkt MP1-7, pkt n-1, and pkt n-2 to channel CH2-1; pkt MP1-8, pkt 2-4, and pkt n-3 to channel CH2-3, and so on.

In another variation, the transbonder 202 may partially debond the received packet data without regard to packet order. In this case, the transbonder 202 may collect MPs of the same group number and chunk corresponding to each MP from communication channels in the incoming bonded channel group 210. Then, the transbonder 202 may distribute each MP and corresponding chunk across communication channels of the outgoing bonded channel group 212 without analyzing the MPs to order the input data. This variation may improve the processing speed in the network device 200 by allowing for fewer steps during the transbonding process. The packet order of the transport stream may be later recovered at a downstream network device, such as the destination 104.

Figure 6:
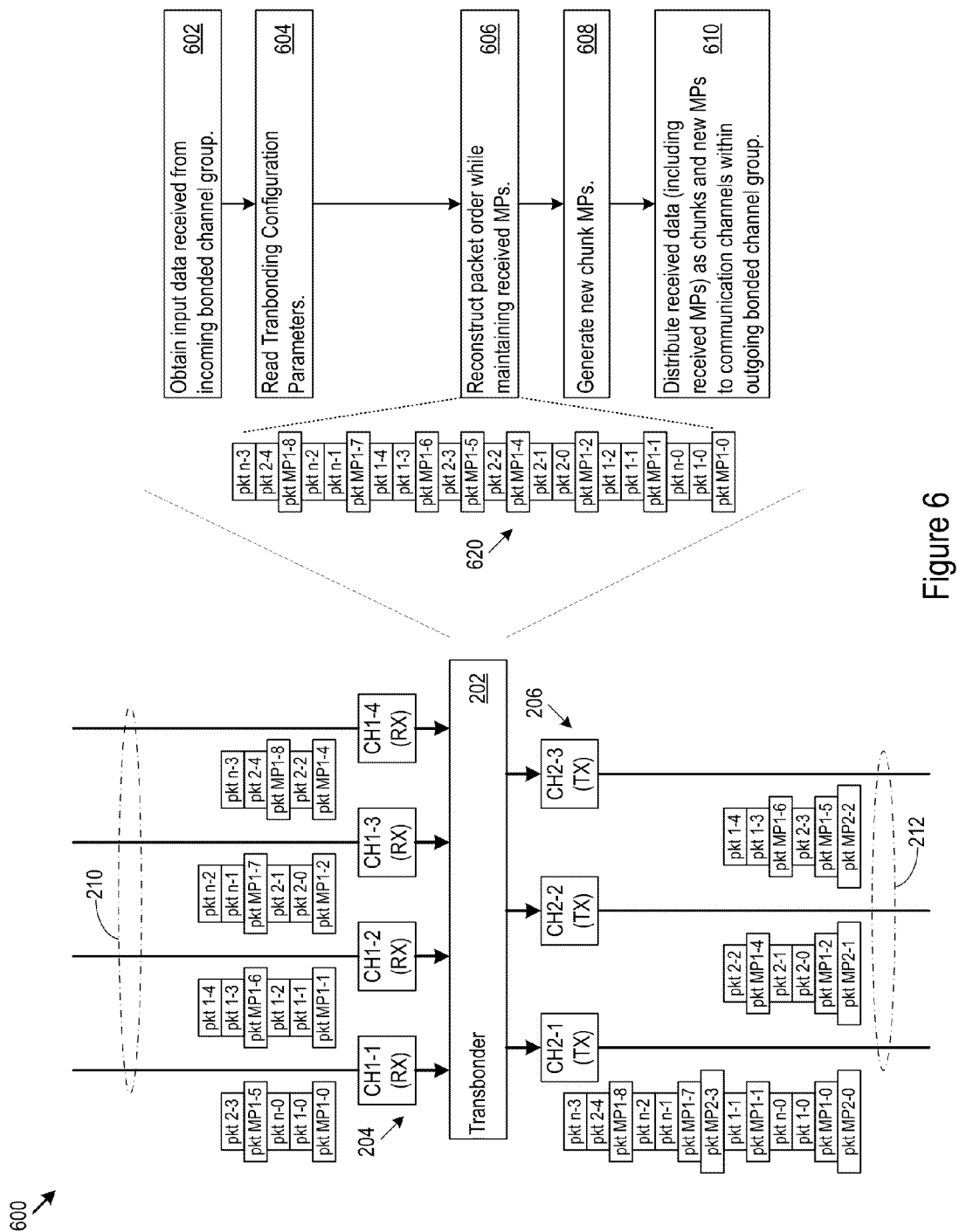
FIG. 6 shows an example of logic for transbonding network data.

FIG. 6 shows an example of logic 600 for transbonding network data that the transbonder 202 may implement in hardware, software, or both. The transbonder 202 obtains input data received through communication channels of an incoming bonded channel group 210 (602) and reads the transbonding configuration parameters (604). The transbonder 202 may partially debond the received input data, as described above. Accordingly, the transbonder 202 may produce a partially debonded transport stream 620 that reconstructs the packet order of a previously distributed transport stream while maintaining some or all of the additional channel bonding information included in the received input data. As seen in FIG. 6, the transbonder 202 maintains the received MPs when reconstructing packet order of the program data or a transport stream (e.g., the STS 110) contained in the received input data (606).

The transbonder 202 may generate new MPs, such as chunk MPs (608). The transbonder 202 may do so even when the transbonder 202 maintains MPs received as input data, e.g., as part of the partially debonded transport stream 620. In that regard, the transbonder 202 may distribute, as an outgoing chunk, one or more previously received incoming chunks and their corresponding MPs. The transbonder 202 may associate a generated chunk MP with the outgoing chunk. As seen in FIG. 6, the transbonder 202 distributes two previously received incoming chunk-MP pairings—e.g., {pkt MP1-0; pkt 1-0; pkt n-0} and {pkt MP1-1; pkt 1-1; pkt 1-2}—as an outgoing chunk with a corresponding MP generated by the transbonder 202, e.g., pkt MP2-0. The transbonder 202 continues to push two previously received incoming chunk-MP pairings from the partially debonded transport stream 620 as an outgoing chunk along with a corresponding chunk MP generated by the transbonder 202. The transbonder 202 pushes the distributed data onto communication channels of the outgoing bonded channel group 212 (610). As seen in FIG. 6, the transbonder 202 distributes the partially debonded transport stream 620 as follows:

generated marker packet pkt MP2-0 and outgoing chunk {pkt MP1-0; pkt 1-0; pkt n-0; pkt MP1-1; pkt 1-1; pkt 1-2} to channel CH2-1; generated marker packet MP2-1 and outgoing chunk {MP1-2; pkt 2-0; pkt 2-1; pkt MP1-4; pkt 2-2} on channel CH2-2; generated market packet MP2-2 and outgoing chunk {pkt MP1-5; pkt 2-3; pkt MP1-6; pkt 1-3; pkt 1-4} on channel CH2-3; then generated marker packet pkt MP2-3 and outgoing chunk {pkt MP1-7; pkt n-1; pkt n-2; pkt MP1-8; pkt 2-4; pkt n-3} on channel CH2-1, and so on.

In one implementation, the transbonder 202 may distribute received incoming chunks as a whole. In other words, the transbonder 202 may distribute the received input data so as to prevent splitting of a received incoming chunk into multiple outgoing chunks.

Figure 7:
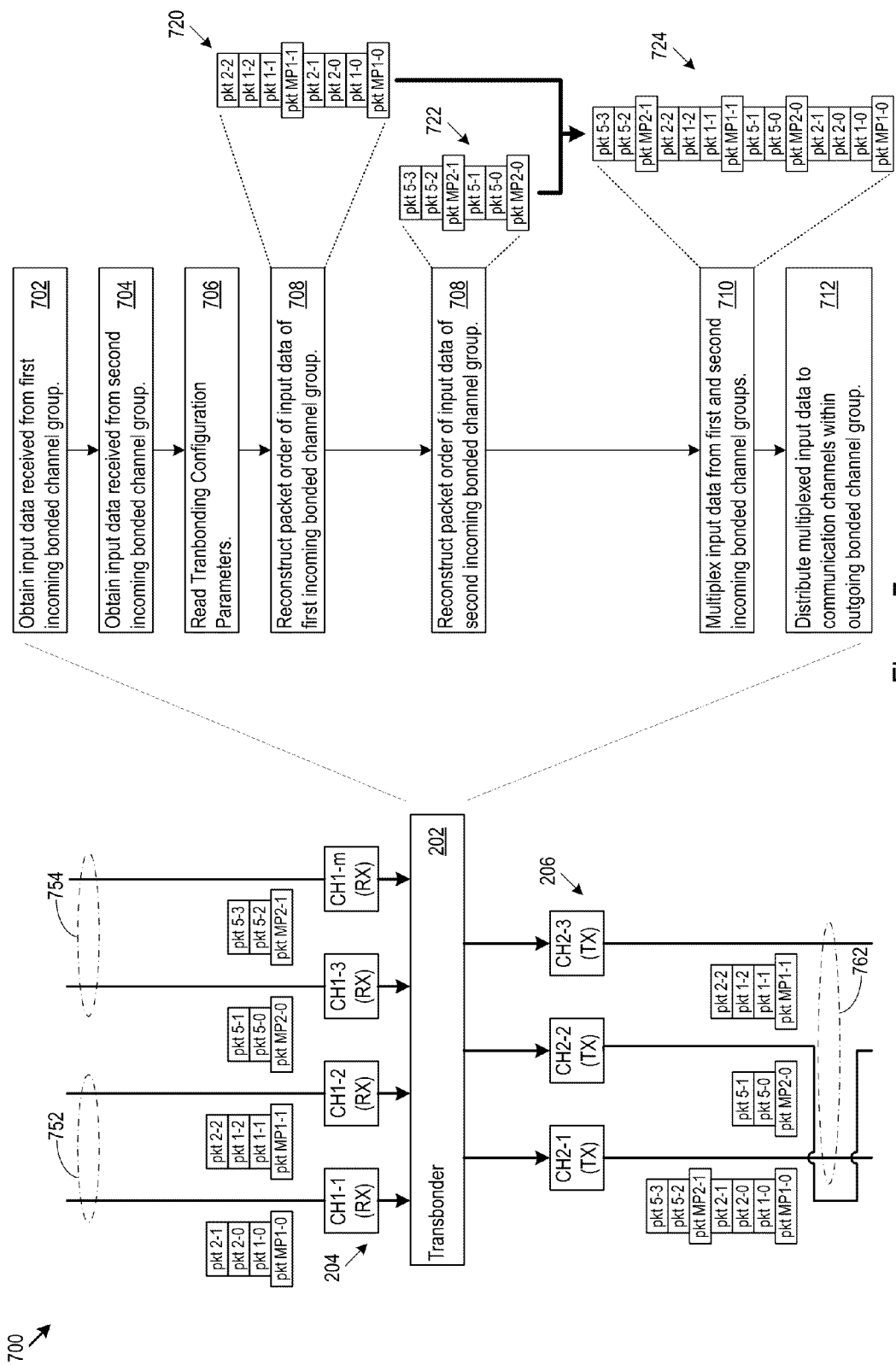
FIG. 7 shows an example of logic for transbonding network data.

FIG. 7 shows an example of logic 700 for transbonding network data received across one or more incoming bonded channel groups, one or more individual incoming communication channels, or any combination thereof. The transbonder 202 may implement the logic 700 in hardware, software, or both. In FIG. 7, the transbonder 202 receives input data from a first incoming bonded channel group 752 (702) that includes communication channels CH1-1 and CH1-2 and a second incoming bonded channel group 754 (704) that includes communication channels CH1-3 and CH1-4. The first and second incoming bonded channel groups may be associated with different upstream devices. For example, the transbonder 202 may receive input data from a first upstream device through the communication channels of the first incoming bonded channel group 752 and input data from a second upstream device through the communication channels of the second incoming bonded channel group 754.

The transbonder 202 reads the transbonding configuration parameters (706) and transbonds the received input data according to the transbonding configuration parameters. The transbonding configuration parameters may indicate the distribution and bonding parameters used by the one or more upstream devices that sent the input data received through the first and second incoming bonded channel groups 752 and 754. In FIG. 7, the transbonding configuration parameters indicate that input data received from the first incoming bonded channel group 752 is sent in a chunk size of 3 packets and includes additional channel bonding information in the form of marker packets. The transbonding configuration parameters also indicate that input data received from the second incoming bonded channel group 754 is sent in a chunk size of 2 packets and includes additional channel bonding information in the form of marker packets.

The transbonder 202 may process and distribute input data received from the first and the second incoming bonded channel groups 752 and 754 in any of the ways discussed above.

The transbonder 202 may fully debond the received input data from a particular incoming bonded channel group or individual incoming communication channel. As one example shown in FIG. 7, the transbonder 202 partially debonds the input data received through the first incoming bonded channel group 752 to produce the first partially debonded transport stream 720 (708), which maintains the marker packets received through the first incoming bonded channel group 752 and/or any additional channel bonding information. The transbonder 202 also partially debonds the input data received through the second incoming bonded channel group 754 to produce the second partially debonded transport stream 722 (710), which maintains the marker packets received through the first incoming bonded channel group 754 and/or any additional channel bonding information.

In one implementation, the transbonder 202 may fully debond input data of one or more incoming bonded channel groups or individual communication channels when the incoming bonded channel groups and/or individual communication channels differ in one or more processing, bonding, or distribution parameters. For example, the transbonder 202 may fully debond input data received from the first incoming bonded channel group 752 and/or the second incoming bonded channel group 754 when one input data contains marker packets while the other input data does not. The transbonder 202 may identify variations in processing, bonding, or distribution parameters that include, as examples, differences in marker packet usage, chunk size, location of additional channel bonding information, form of additional channel bonding information, absence of additional channel bonding information, or other variations. In response to identifying a variation between input data received from the first and second incoming bonded channel groups 752 and 754, the transbonder 202 may fully debond input data from the first incoming bonded channel group 752, the second incoming bonded channel group 754, or both.

In another variation, the transbonder 202 may process, e.g., partially debond, input data from any incoming bonded channel group and/or individual incoming communication channel to correspond to the processing, bonding, or distribution parameters applied to input data of another incoming bonded channel group and/or individual incoming communication channel. As one illustration, the transbonder 202 may discard marker packets when processing (e.g., ordering) input data from the first incoming bonded channel group 752 when input data from the second incoming bonded channel group 754 does not include marker packets.

As another example, the transbonder 202 may vary the degree input data from different incoming bonded channel groups or incoming individual communication channels are debonded. For example, the transbonder 202 may fully debond input data received from the first incoming bonded channel group 752 and partially debond input data received from the second incoming bonded channel group 754, maintaining, as an example, marker packets received through the second incoming bonded channel group 754.

Continuing the transbonding process, the transbonder 202 may multiplex the input data from the first and second incoming bonded channel groups 752 and 754 (710) to obtain the multiplexed input data stream 724. In this regard, the transbonder 202 may share any number of similarities or features with the statistical multiplexer 106. Then, the transbonder 202 distributes the multiplexed input data stream 724 to communication channels in the outgoing bonded channel group 762, for example, in any of the ways discussed above. As seen in FIG. 7, the transbonder 202 distributes the multiplexed input data stream 724 while maintaining the chunk size and marker packets of the received input data, and as follows:

pkt MP1-0, pkt 1-0, pkt 2-0, and pkt 2-1 to channel CH2-1;
pkt MP2-0, pkt 5-0 and pkt 5-1 to channel CH2-2; pkt MP1-1, pkt 1-1, pkt 1-2, and pkt 2-2 to channel CH2-3; then
pkt MP2-1, pkt 5-2, and pkt 5-3 to channel CH2-1, and so on.

While one distribution example is presented through logic 700, the transbonder 202 may distribute the multiplexed input data stream 724 according to any of the ways described above or in U.S. patent application Ser. No. 13/673,028, including variations according to marker packets, chunk sizes, and additional bonding information form, content, and/or location.

While FIG. 7 shows the transbonder 202 receiving input data from two incoming bonded channel groups, the exemplary logic 700 may similarly transbond received input data from any combination of one or more incoming bonded channel groups, one or more individual incoming communication channels, or any combination of both.

Figure 8:
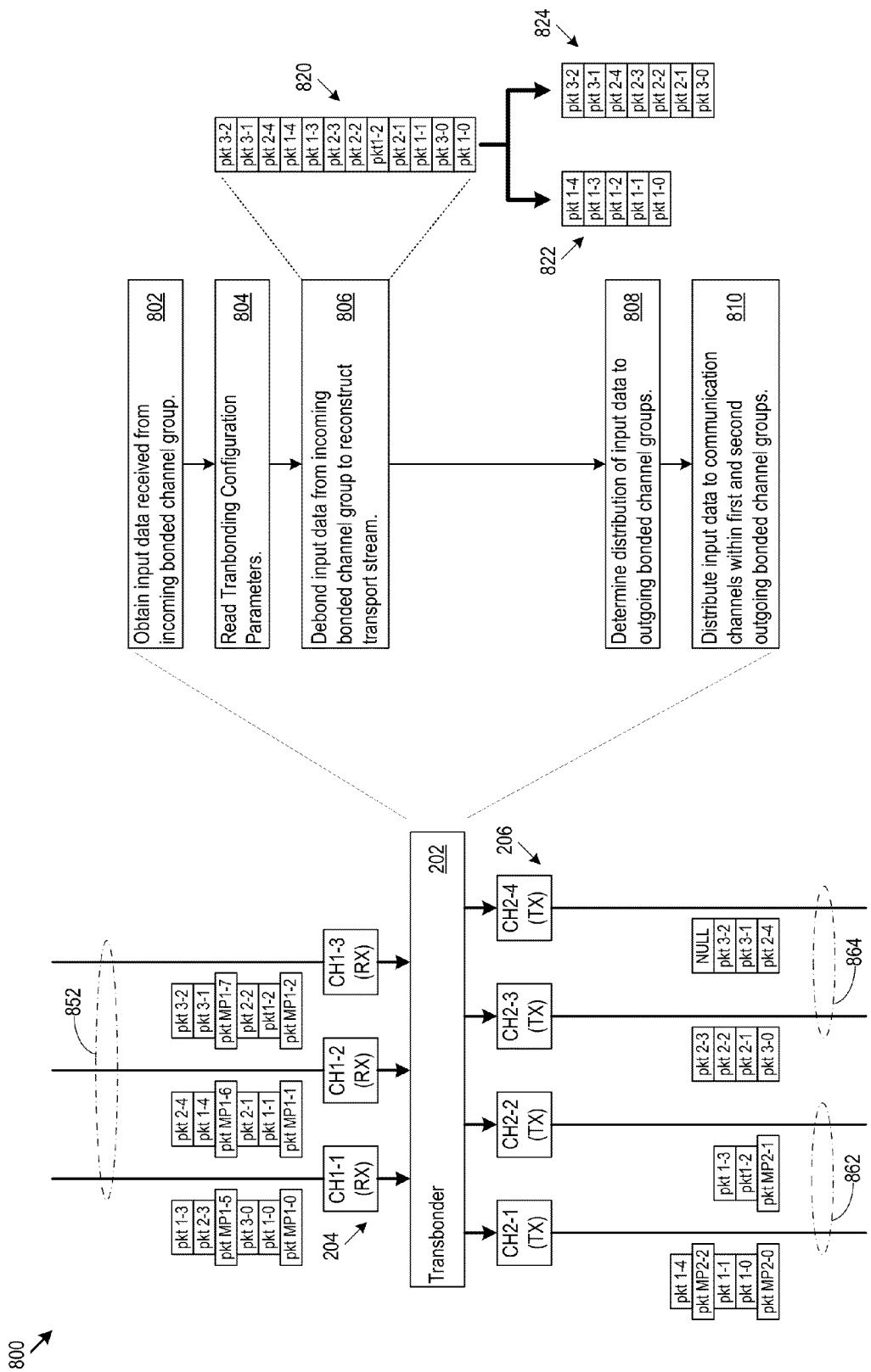
FIG. 8 shows an example of logic for transbonding network data.

FIG. 8 shows an example of logic 800 for transbonding network data for distribution across one or more outgoing bonded channel groups, one or more individual outgoing communication channels, or any combination of both. The transbonder 202 may implement the logic 800 in hardware, software, or both. In FIG. 8, the transbonder 202 receives input data through incoming bonded channel group 852 and sends received input data across a first outgoing bonded channel group that includes channels CH2-1 and CH-2-2 as well as a second outgoing bonded channel group 864 that includes channels CH2-3 and CH2-4.

In operation, the transbonder 202 obtains input data received through communication channels of the incoming bonded channel group 852 (802) and reads the transbonding configuration parameters (804).

The transbonder 202 transbonds, e.g., processes, the received input data according to the transbonding configuration parameters. As discussed above, the transbonding configuration parameters may specify the degree which the transbonder 202 debonds the received input data. The transbonder 202 may process received input data in any of the ways described above, e.g., fully or partial debonding, maintaining or discarding particular additional bonding information, etc. In the example shown in FIG. 9, the transbonder 202 debonds the input data (806) to obtain the reconstructed transport stream 820, which includes discarding the marker packets included in the received input data.

Continuing the transbonding process, the transbonder 202 determines the distribution of the received input data across the outgoing bonded channel groups 862 and 864 (808). The transbonder 202 may determine to send none, some, or all of the received input data across the first outgoing bonded channel group 862. Similarly, the transbonder 202 may determine to send none, some, or all of the received input data across the second outgoing bonded channel group 864.

The transbonder 202 may divide the input data for distribution across the outgoing bonded channel groups 862 and 864 according to any number of distribution criteria. The transbonder 202 may determine distribution of the input data according to any characteristics of the input data, such as destination IP address, destination MAC address, quality of service (QoS) requirements, latency requirements, destination network or subnetwork, packet type, packet content, communication type, security requirement, or any other criteria or packet characteristic.

As one example, shown in FIG. 8, the transbonder 202 determines distribution of the input data according to the PID associated with packets of the input data. In this example, the transbonder 202 processes, e.g., divides, the reconstructed transport stream 820 into a first outgoing transport stream 822 that includes packets associated with program '1' (e.g., PID='1') and a second outgoing transport stream 822 that includes packets associated with programs '2' and '3' (e.g., PID='2' or '3'). In this way, a network device or end device, e.g., set top box (STB), that requests particular data may communicate across a particular bonded channel group. To illustrate, a STB may receive data from the transbonder 202 through both the first and second outgoing bonded channel groups 862 and 864. When the STB is tuned to receive program 1 (e.g., packet data with PID='1'), then the STB may receive data from the transbonder 202 across the first outgoing bonded channel group 862. When the STB is tuned to receive program 2 or 3 (e.g., packet data with PID='2' or '3'), then the STB may receive data from the transbonder 202 across the second outgoing bonded channel group 864. In this way, the STB may conserve communication bandwidth and receive a particular program without having to utilize all 4 communication channels.

In one variation, the transbonder may discard a selected portion of the input data when determining distribution of the input data to outgoing bonded channel groups. The transbonder 202 may discard input data according to any of the packet characteristics or criteria discussed above, e.g., IP address, QoS, security, PID, etc.

The transbonder 202 distributes the input data to communication channels in outgoing bonded channel groups and/or individual outgoing communication channels according to the determined distribution. In FIG. 8, the transbonder distributes the input data to communication channels within the first outgoing bonded channel group 862 and the second outgoing bonded channel group 864 (810). The transbonder 202 may distribute the respective input data across each outgoing bonded channel group in any of the ways discussed above. Also, the transbonder 202 may vary distribution of input data across different outgoing bonded channel groups and/or individual outgoing bonded channel groups. The transbonder 202 may vary if and how additional bonding information is communicated with the respective outgoing data for a particular outgoing bonded channel group and/or individual outgoing communication channel. For example, as shown in FIG. 8, the transbonder 202 may generate and send marker packets with input data sent across communication channels CH2-1 and CH2-2 of the first outgoing bonded channel group 862. Specifically, the transbonder 202 distributes data from the first outgoing transport stream 822 in a chunk size of 2 packets preceded by a generated marker packet. Thus, transbonder 202 may distribute the exemplary first outgoing transport stream 822 of {pkt 1-0, pkt 1-1, pkt 1-2, pkt 1-3, pkt 1-4} and generated marker packets as follows:

pkt MP2-0, pkt 1-0, and pkt 1-1 to channel CH2-1 and pkt MP2-1, pkt 1-2, and pkt 1-3 to channel 2-2; then
  pkt MP2-2 and pkt 1-4 to CH2-1, and so on.

In contrast, the transbonder 202, in the example shown in FIG. 8, does not generate or send marker packets when distributing input data across channels CH2-3 and CH2-4 of the second outgoing bonded channel group 864. Instead, the transbonder 202 distributes the second outgoing transport stream 824 in chunk sizes of 4 packets, which may include inserting a null packet for distribution across channel CH2-4.

While FIG. 8 shows the transbonder 202 distributing input data for deliver across two outgoing bonded channel groups, the exemplary logic 800 may similarly distribute received input data across any combination of one or more outgoing bonded channel groups, one or more individual outgoing communication channels, or any combination of both.

The transbonder 202 may implement any of the exemplary logic 300-800 described above, in part, in whole, or in any combination. As one variation, the transbonder 202 may debond input data into a reconstructed transport stream when the outgoing bonded channel group 212 includes a single communication channel. That is, the transbonder 202 may remove, e.g., discard, any marker packets received as input data through an incoming bonded channel group 210. Then, the transbonder 202 may distribute the reconstructed transport stream across the single communication channel in the outgoing bonded channel group 212. As another variation, the transbonder 202 may maintain marker packets received as input data when the outgoing bonded channel group 212 includes a single communication channel.

Figure 9:
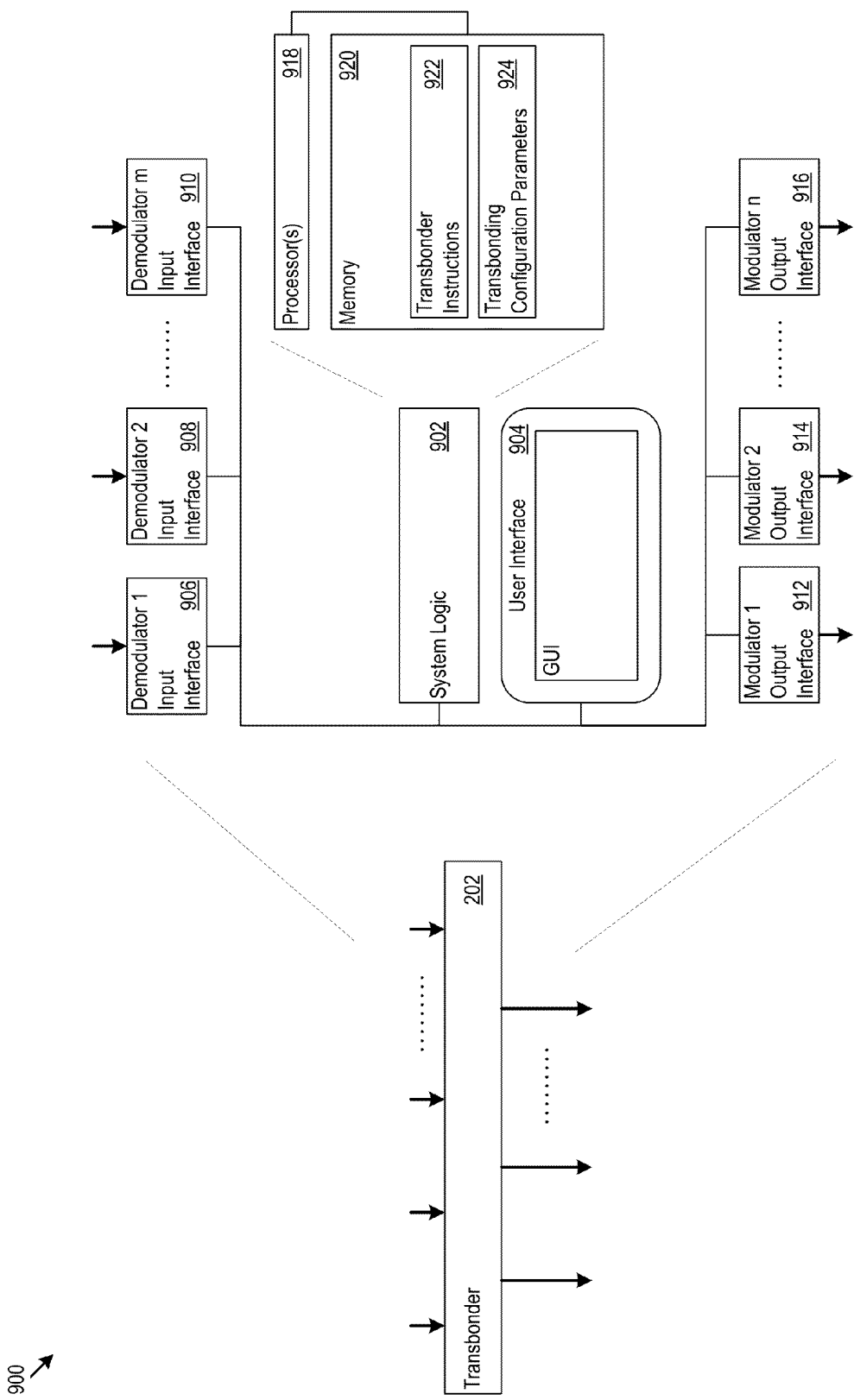
FIG. 9 shows an example implementation of a transbonder.

FIG. 9 shows an example implementation 900 of a transbonder 202. The transbonder 202 includes system logic 902 and a user interface 904. In addition, the transbonder includes demodulator input interfaces, such as those labeled 906, 908, and 910, as well as modulator output interfaces, such as those labeled 912, 914, and 916. The demodulator input interfaces 906-910 feed input data to the transbonder system logic 902, which will process received input data from any number of incoming bonded channel groups, incoming individual communication channels, or any combination of both. The system logic 902 processes received input data for delivery across any number of outgoing bonded channel groups, outgoing individual communication channels, or any combination of both. The modulator output interfaces 912-916 feed data to the modulators that drive data over the communication channels. The demodulator input interfaces 906-910 and/or the modulator output interfaces 912-916 may be serial or parallel bus interfaces, as examples. The transbonder 202 may also include a communication interface for communicating configuration communications 134 with other network devices in the content delivery architecture 100, for example.

The transbonder system logic 902 implements in hardware, software, or both, any of the logic described in connection with the operation of the transbonder 202 (e.g., with respect to FIGS. 1-8). As one example, the system logic 902 may include one or more processors 918 and program and data memories 920. The program and data memories 920 hold, for example, transbonding instructions 922 and the transbonding configuration parameters 924.

The processors 918 execute the transbonding instructions 922, and the transbonding configuration parameters 924 inform the processors 918 as to the type of channel transbonding the processors 918 will perform. As a result, the processors 918 may implement the any of the transbonding processes described above. The transbonder 202 may accept input from the user interface 904 to change, view, add, or delete any of the transbonding configuration parameters 924.

Figure 10:
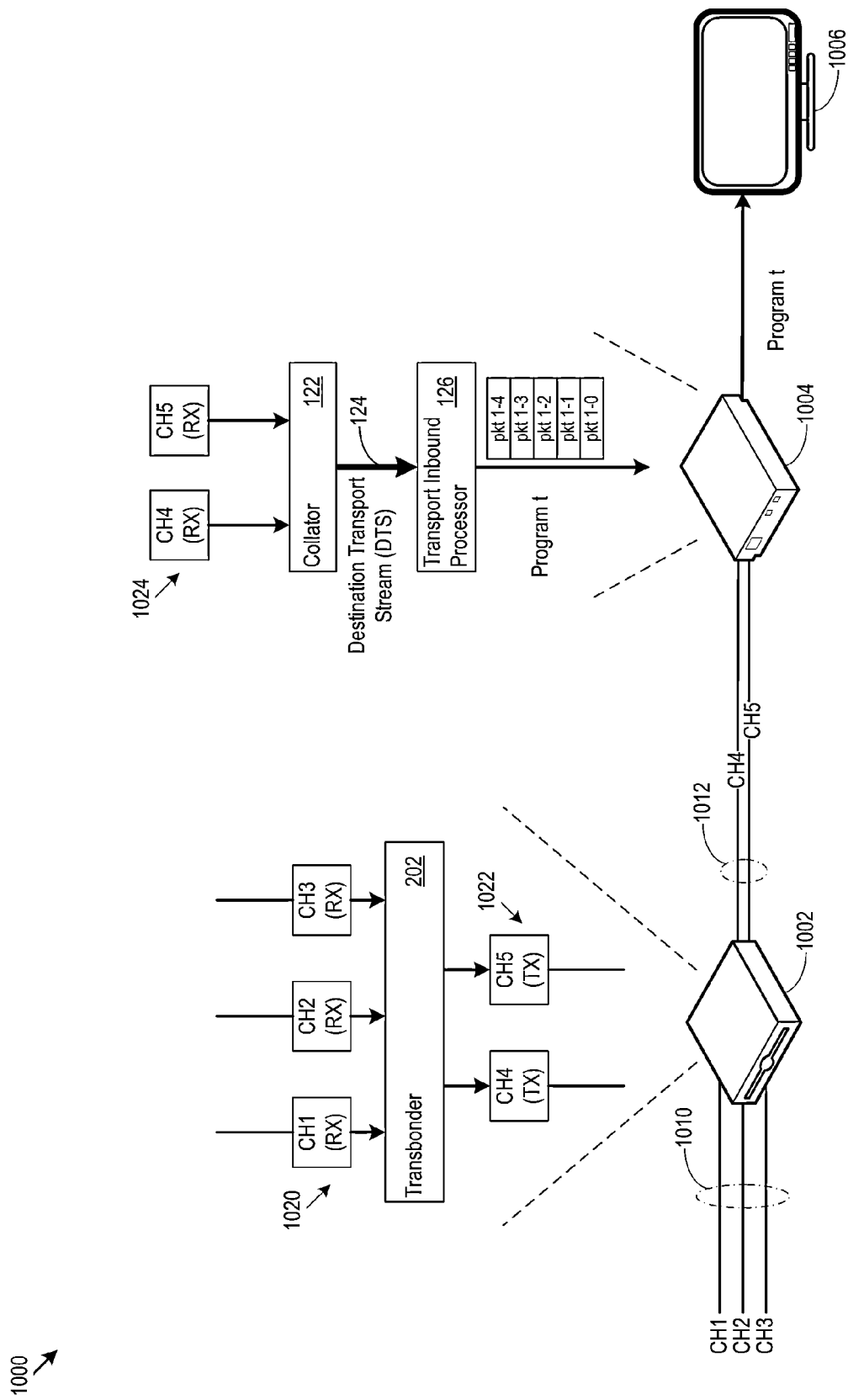
FIG. 10 shows an example content delivery architecture that employs channel bonding.

FIG. 10 shows an example content delivery architecture 1000 that employs channel bonding. The architecture 1000 illustrates one particular transbonding environment, and includes the gateway device 1002, set top box (STB) 1004, and display device 1006. The gateway device 1002 may be act as an intermediate network node in a content deliver architecture, and share any number of similarities with network device 115 described above. In FIG. 10, the gateway device 1002 acts as a media gateway and receives data across the incoming bonded channel group 1010 that includes the three communication channels labeled as CH1, CH2, and CH3. Communication channels CH1-3 may be any of the communication channel types listed above. As one particular example, CH1 implements a cable connection, CH2 implements a DSL connection, and CH3 implements a power line connection.

The gateway device 1002 sends data to the set top box through the outgoing bonded channel group 1012, which includes the two communication channels labeled as CH4 and CH5. In this example, CH4 and CH4 each implement an Ethernet connection linking the gateway device 1002 and STB 1004. The gateway device 1002 includes the transbonder 202, the three demodulators 1020 corresponding to CH1, 2, and 3 respectively, and the two modulators 1022 corresponding to CH4 and 5 respective.

The STB 1004 acts an endpoint device in the architecture 1000. In that regard, the STB 1004 may share any number of similarities to the destination 104 described above. The STB 1004 includes two demodulators 1024 to receiving data on communication channels CH4 and 5, the collator 122 for producing the DTS 124, and the TIP 126. The STB 1004 may receive input data originating from a source 102 and recover a selected program, such as program 't'. The STB 1004 may send program 't' to the display device 1006 for presentation.

In operation, the gateway device 1002 receives program data through incoming bonded channel group 1010, transbonds the received program data according to any combination of the methods discussed above, and delivers the program data to the STB 1004 through the outgoing bonded channel group 1012. The STB 1004 receives the program data and processes the program data for display through the display device 1006.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising, by a network device:
    receiving a first set of program packets from a first set of communication channels in a first incoming bonded channel group;
    receiving a second set of program packets from a second set of communication channels in a second incoming bonded channel group, the second incoming bonded channel group different from the first incoming bonded channel group;
    combining the first and second set of program packets into a combined set of program packets; and
    distributing the combined set of program packets across a third set communication channels in an outgoing bonded channel group.

2. The method of claim 1, wherein combining the first and second set of program packets comprises:
    arranging the first set of program packets into program order;
    arranging the second set of program packets into program order separately from the arranging of the first set of program packets; and
    after arranging the first and second set of program packets:
        multiplexing the first set of program packets with the second set of program packets to obtain the combined set of program packets.

3. The method of claim 1, further comprising:
    receiving first marker packets corresponding with the first set of program packets; and
    wherein distributing the combined set of program packets comprises distributing the combined set of program packets with the first marker packets.

4. The method of claim 3, further comprising:
    receiving second marker packets corresponding with the second set of program packets; and
    wherein distributing the combined set of program packets comprises distributing the combined set of program packets with both the first and second marker packets.

5. The method of claim 3, further comprising:
    receiving second marker packets corresponding with the second set of program packets;
    discarding the second marker packets; and
    wherein distributing the combined set of program packets comprises distributing the combined set of program packets with the first marker packets but without the second marker packets.

6. The method of claim 1, further comprising:
    receiving first marker packets corresponding with the first set of program packets; and
    determining that marker packets corresponding with the second set of program packets are not received and, in response, discarding the first marker packets; and
    wherein distributing the combined set of program packets comprises distributing the combined set of program packets without the first marker packets.

7. The method of claim 1, wherein the first set of program packets is received from a first upstream device and the second set of program packets is received from a second upstream device different from the first upstream device.

8. A system comprising:
   first input interfaces to a first set of individual communication channels that form a first incoming bonded channel group;
   second input interfaces to a second set of individual communication channels that form a second incoming bonded channel group different from the first incoming bonded channel group;
   output interfaces to a third set of individual communication channels that form an outgoing bonded channel group; and
   transbonding circuitry in communication with the first and second input interfaces and the output interfaces, the transbonding circuitry configured to:
      access a first set of program packets received through the first incoming bonded channel group;
      access a second set of program packets received through the second incoming bonded channel group;
      combine the first and second set of program packets into a combined set of program packets; and
      distribute the combined set of program packets across the outgoing bonded channel group.

9. The system of claim 8, wherein the transbonding circuitry is configured to combine the first and second set of program packets by:
   arranging the first set of program packets into program order;
   arranging the second set of program packets into program order separately from the arranging of the first set of program packets; and
   after arranging the first and second set of program packets:
   multiplexing the first set of program packets with the second set of program packets to obtain the combined set of program packets.

10. The system of claim 8, wherein the transbonding circuitry is further configured to receive first marker packets corresponding with the first set of program packets; and
   wherein the transbonding circuitry is configured to distribute the combined set of program packets with the first marker packets.

11. The system of claim 10, wherein the transbonding circuitry is further configured to receive second marker packets corresponding with the second set of program packets; and
   wherein the transbonding circuitry is configured to distribute the combined set of program packets with both the first and second marker packets.

12. The system of claim 10, wherein the transbonding circuitry is further configured to:
   receive second marker packets corresponding with the second set of program packets; and
   discard the second marker packets; and
   wherein the transbonding circuitry is configured to distribute the combined set of program packets with the first marker packets but without the second marker packets.

13. The system of claim 8, wherein the transbonding circuitry is further configured to:
   receive first marker packets corresponding with the first set of program packets; and
   determine that marker packets corresponding with the second set of program packets are not received and, in response, discard the first marker packets; and
   wherein the transbonding circuitry is configured to distribute the combined set of program packets without the first marker packets.

14. The system of claim 8, wherein the first set of program packets is received from a first upstream device and the second set of program packets is received from a second upstream device different from the first upstream device.

15. A product comprising:
   a machine-readable medium other than a transitory signal; and
   instructions stored on the machine-readable medium, the instructions configured to, when executed:
      receive a first set of program packets from a first set of communication channels in a first incoming bonded channel group;
      receive a second set of program packets from a second set of communication channels in a second incoming bonded channel group, the second incoming bonded channel group different from the first incoming bonded channel group;
      combine the first and second set of program packets into a combined set of program packets; and
      distribute the combined set of program packets across a third set communication channels in an outgoing bonded channel group.

16. The product of claim 15, where the instructions are configured to combine the first and second set of program packets by:
   arranging the first set of program packets into program order;
   arranging the second set of program packets into program order separately from the arranging of the first set of program packets; and
   after arranging the first and second set of program packets, multiplexing the first set of program packets with the second set of program packets to obtain the combined set of program packets.

17. The product of claim 15, where the instructions are further configured to, when executed:
   receive first marker packets corresponding with the first set of program packets; and
   where the instructions are configured to distribute the combined set of program packets by distributing the combined set of program packets with the first marker packets.

18. The product of claim 17, where the instructions are further configured to, when executed:
   receive second marker packets corresponding with the second set of program packets; and
   where the instructions are configured to distribute the combined set of program packets by distributing the combined set of program packets with both the first and second marker packets.

19. The product of claim 15, where the instructions are further configured to, when executed:
   receive the first set of program packets from a first upstream device; and
   receive the second set of program packets from a second upstream device different from the first upstream device.

20. The product of claim 15, where the instructions are further configured to, when executed:
   receive first marker packets corresponding with the first set of program packets; and
   determine that marker packets corresponding with the second set of program packets are not received and, in response, discarding the first marker packets; and
   where the instructions are configured to distribute the combined set of program packets by distributing the combined set of program packets without the first marker packets.

* * * * *